(12) United States Patent
Petit et al.

(10) Patent No.: US 10,748,668 B2
(45) Date of Patent: Aug. 18, 2020

(54) BELT FOR MEASURING PHYSICAL QUANTITIES OF AN OBJECT

(71) Applicant: Electricite de France, Paris (FR)

(72) Inventors: Marc Petit, Pontoise (FR); Sylvain Blairon, Montesson (FR)

(73) Assignee: Electricite de France (FR)

( * ) Notice: Subject to any disclaimer, the term of this patent is extended or adjusted under 35 U.S.C. 154(b) by 210 days.

(21) Appl. No.: 15/760,701

(22) PCT Filed: Sep. 15, 2016

(86) PCT No.: PCT/EP2016/071788
§ 371 (c)(1),
(2) Date: Mar. 16, 2018

(87) PCT Pub. No.: WO2017/046222
PCT Pub. Date: Mar. 23, 2017

(65) Prior Publication Data
US 2019/0252085 A1 Aug. 15, 2019

(30) Foreign Application Priority Data

Sep. 18, 2015 (FR) .................................. 15 58823

(51) Int. Cl.
*G01K 1/14* (2006.01)
*G21C 17/112* (2006.01)

(52) U.S. Cl.
CPC ............. *G21C 17/112* (2013.01); *G01K 1/14* (2013.01)

(58) Field of Classification Search
CPC ... G03G 2215/2032; G03G 2215/2016; G03G 15/2053; G03G 15/2064; G01K 1/14;
(Continued)

(56) References Cited

U.S. PATENT DOCUMENTS 2,967,269 A * 1/1961 Vaughan ................ H01H 81/02
318/783
4,529,869 A 7/1985 Ekstrom, Jr.
(Continued)

OTHER PUBLICATIONS

International Search Report in PCT/EP2016/071788 dated Jan. 12, 2016.
(Continued)

*Primary Examiner* — Gail Kaplan Verbitsky
(74) *Attorney, Agent, or Firm* — Lerner, David, Littenberg, Krumholz & Mentlik, LLP

(57) ABSTRACT

The invention relates to a belt for measuring physical quantities of an object, comprising at least one measurement sensor, a strip and a device for clamping the strip around the object. According to the invention, the belt comprises a pressing device for pressing the measurement sensor in a first orientation toward the object, comprising a casing attached to the strip, an intermediate part and a constraining member to have the intermediate part assume a first low position in which it presses toward the sensor in the first orientation, a lifting member, for holding the intermediate part in a second lifting position above the first low position against the constraining member, the lifting member being actuable from the outside of the casing to have the intermediate part pass from the second lifting position to the first low position in which it presses toward the sensor.

20 Claims, 9 Drawing Sheets

Figure 1:
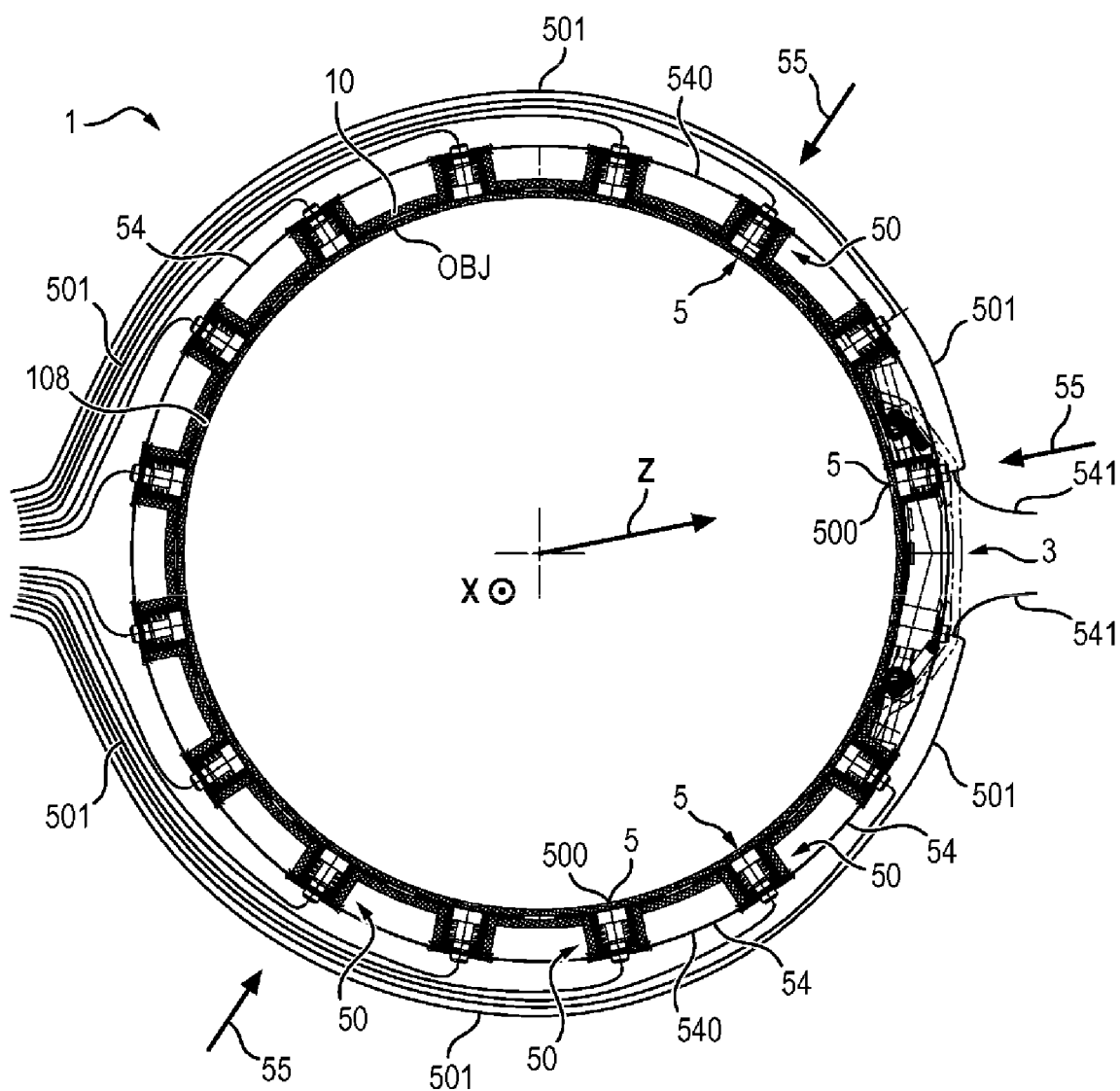

(58) Field of Classification Search
CPC .... G01K 11/3206; G01K 13/00; G01K 17/00;
G01K 1/08; G01K 17/06; G01N 25/72
USPC ... 374/137, 141, 143, 45, 57, 208, 166, 179,
374/110; 73/866.5
See application file for complete search history.

(56) References Cited

U.S. PATENT DOCUMENTS

| | | | |
|---|---|---|---|
| 4,553,432 A | 11/1985 | Barlian et al. | |
| 8,511,892 B2* | 8/2013 | Koch | A61B 5/6831 |
| | | | 374/120 |
| 2004/0014384 A1* | 1/2004 | Sloot | B32B 27/12 |
| | | | 442/131 |
| 2004/0260167 A1* | 12/2004 | Leonhardt | A61B 5/0536 |
| | | | 600/390 |
| 2009/0038911 A1* | 2/2009 | Aizawa | B65G 15/08 |
| | | | 198/502.1 |
| 2013/0259088 A1* | 10/2013 | Bellis | G01K 1/026 |
| | | | 374/138 |
| 2015/0168230 A1* | 6/2015 | DeSilva | G01K 11/24 |
| | | | 374/117 |
| 2016/0290972 A1* | 10/2016 | Lepage | G01N 29/30 |
| 2017/0328784 A1* | 11/2017 | Blundell | F27D 21/0014 |
| 2018/0038008 A1* | 2/2018 | Mitsuya | H01L 21/76879 |
| 2019/0298218 A1* | 10/2019 | Nebuya | A61B 5/683 |

OTHER PUBLICATIONS

French Preliminary Search Report for FR1558823 dated Jul. 8, 2016.

* cited by examiner

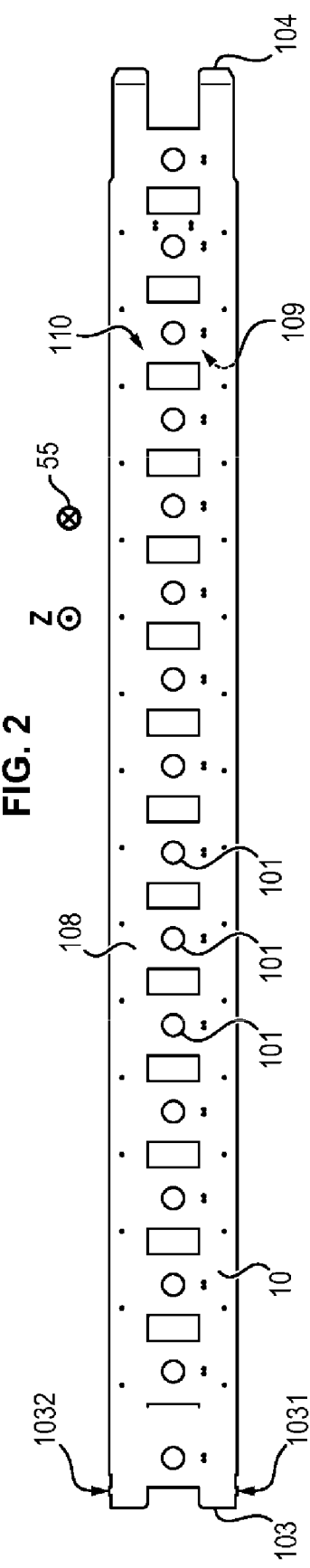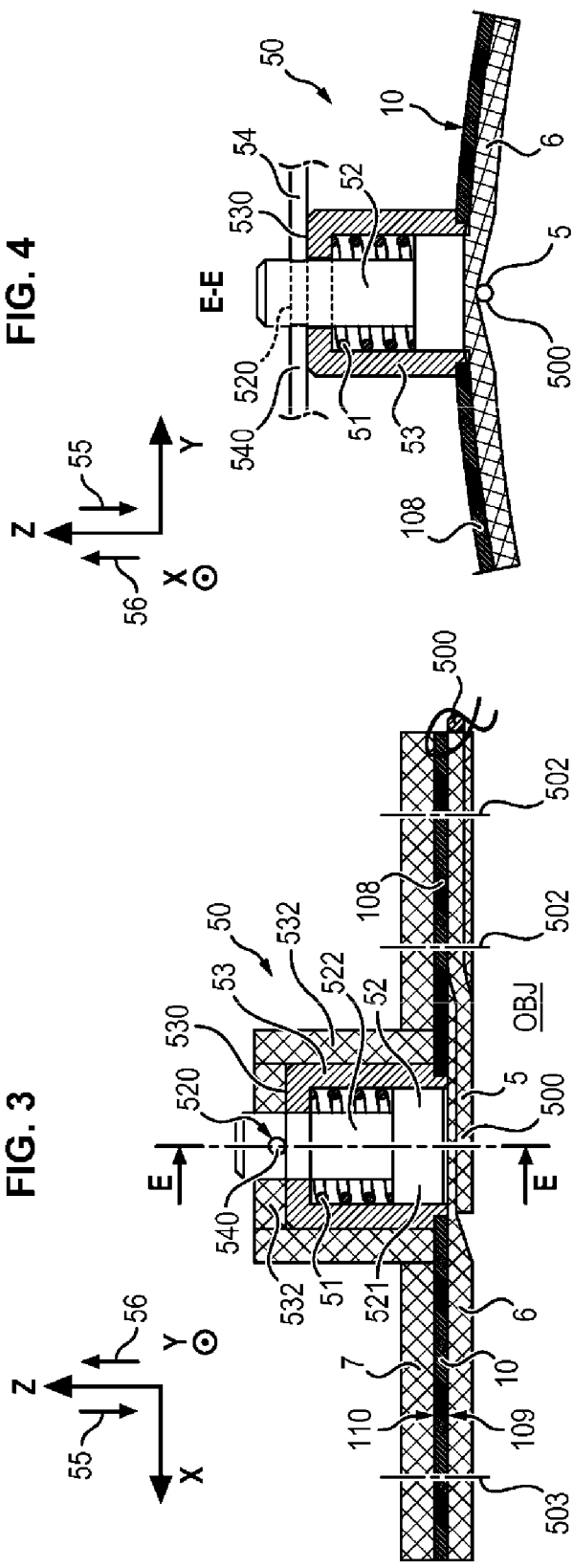

BELT FOR MEASURING PHYSICAL QUANTITIES OF AN OBJECT

CROSS REFERENCE TO RELATED APPLICATIONS

The present application is a national phase entry under 35 U.S.C. § 371 of International Application No. PCT/EP2016/071788 filed Sep. 15, 2016, published in French, which claims priority from French Patent Application No. 1558823 filed Sep. 18, 2015, all of which are incorporated herein by reference.

The invention relates to a belt for measuring physical quantities such as for example temperature, level, heat flow, of an object.

One field of application of the invention relates in particular to water pipes such as for example those of the primary circuit of nuclear power plants.

Such a belt for measuring temperature is known for example from U.S. Pat. No. 4,553,432. In this known belt, a temperature monitoring electric wire is attached to the belt by a clamping block situated in a groove of a thermal insulation surrounding the pipe. This known belt is used to measure the temperature and the humidity around steam pipes, so as to detect leakage there, or in a drain of a nuclear power plant to detect that the water falling into this drain comes from a leak, so as to be used as a surveillance system for it.

One of the disadvantages of this known belt is that the temperature sensor is not applied directly against the pipe, of which the temperature must be measured, but rather a layer of thermal insulation is provided between the temperature sensor and the pipe.

Now, in order to have a reliable temperature measurement, it is desired to have satisfactory contact between the temperature sensor and the object.

In particular, the invention must be able to be used in certain constraining environments, such for example as those having reduced space, high temperature, ionizing radiation, such as for example on water pipes of pressurized-water reactors (abbreviated PWRs) of electricity production power plants.

These environments are subjected to supplementary qualification requirements of the measurement belt, which can for example be resistance to earthquakes, resistance to pressure, resistance to high temperatures, resistance to humidity, resistance to high mechanical constraints.

In addition, in the case of an environment subjected to ionizing radiation, as for example for a water pipe of a pressurized-water nuclear reactors, the persons who must install the measurement belt on the pipe are exposed to this radiation. It follows not only that the staff must intervene very rapidly to minimize the quantity of radiation received during the intervention but must also have a measurement belt that is reliable, systematic and able to adapt to any type of object on which it must be installed.

Thus, the measurement belt must for example be able to be installed on an object which may have a mean temperature of 300° C. in the case of a pipe of an electricity production power plant in operation, and 70° C. when stopped.

In the case of a water pipe of a nuclear reactor of an electricity production power plant, subjected to ionizing radiation, the irradiation in the assembly zone of the belt can attain 5 kGy/year (or 100000 Gy in 20 years) at full power. Thus, these environments must not be penalizing factors on the assembly time and the good positioning of the attachment belt on the object.

In the case of a water pipe of a nuclear reactor of an electricity production power plant, thermocouples placed directly in contact with the zone to be studied to measure temperature are known.

Thermocouples being directly welded to piping is known, creating surface constraint zones. At the conclusion of instrumentation, it was necessary to grind the surface on the thickness impacted by the constraint zone so as to avoid any risk of later cracking. This solution can respond partially to the problem of dynamic behavior but is shown to be very penalizing in terms of dosimetry because the time required for installation and proper positioning of the sensor and the reconditioning of the piping at the conclusion of the measurement campaign is high. But much of the piping is not accessible to this type of implementation. In the case of thermal fatigue measurement, a large number of sensors (8 to 20 for sections of 5 to 40.6 cm) must be placed according to a predefined distribution depending on the phenomena expected on the same circumference of the piping. The layout, and even more the welding in place of each sensor individually on the piping is difficult and sometimes even impossible due to the presence of supports and obstacles not allowing a welder to operate in a reasonable time. This problem returns during the removal of the instrumentation, during which it is necessary to manage the effluents due to the grinding of the piping. This type of instrumentation is accompanied by a very complex technical file and administrative authorizations that are difficult to obtain.

In addition, the implementation of positioning and attachment systems of sensors to the piping grouped within the same device generally has problems of heat conduction between sensors and piping and of common modes between sensors.

Thus, the invention aims to obtain a belt for the measurement of physical quantities of an object that mitigates the disadvantages of the prior art and responds to the requirements of these constraining environments and remains reliable in them by requiring a very short intervention time of the staff for assembling the belt to the object in these environments.

To this end, the invention provides a belt for measuring an object, the belt comprising:
  at least one measurement sensor,
  a strip having a circumference intended to surround the object,
  a device for clamping the strip around the object,
  characterized in that the belt further comprises a pressing device for pressing the measurement sensor in a first orientation of a first direction directed toward the object,
  the pressing device comprising at least one casing attached to the strip (10), at least one intermediate part housed in the casing, and at least one constraining member inserted between the casing and the intermediate part and capable of having the intermediate part assume a first low position in which it presses toward the sensor in the first orientation of the first direction toward the object,
  the pressing device of the sensor further comprises a lifting member, for holding the intermediate part in a second lifting position above the first low position in a second orientation of the first direction, opposite the first orientation against the constraining member, the lifting member being actuable from the outside of the casing to have the intermediate part pass from the second lifting position to the first low position in which it presses toward the sensor.

Thanks to the invention, it is possible to immobilize the sensor with rapidity and reliability against the object in environments constraining to the staff. Thus, the direct assembly of the sensor against the object can be systematized with great rapidity in constraining environments such as those mentioned above and requiring great rapidity of intervention by the staff. Thanks to the invention, the sensor can be applied directly against the object by the pressing device. In addition, the second lifting position allows first positioning the belt around the object, so as to not yet exert pressure on the sensor, then, passing from the second lifting position to the first low position, pressing the sensor against the object. Thus, the installation of the belt, due to the fact that it is accomplished with the second lifting position of the pressing device, is not interfered with by the pressing of the sensor against the object, which is carried out only later, once the belt is positioned and attached to the object, when the pressing device passes from the second lifting position to the first low position guaranteeing optimal coupling of the sensor. This also allows not damaging the sensors during the installation of the belt.

According to one embodiment of the invention, the lifting member passes through a first guide provided in the intermediate part and abuts against an abutment of the casing in the second lifting position, the lifting member being capable of being removed from the first guide of the intermediate part to have the intermediate part pass from the second lifting position to the first low position in which it presses toward the sensor.

According to one embodiment of the invention, the first guide comprises in the intermediate part a hole for letting through the lifting member in the intermediate part during its passage into the second lifting position.

According to one embodiment of the invention, the lifting member comprises a wire having at least one end section situated outside the casing to allow the lifting member to be removed.

According to one embodiment of the invention, the measurement sensor is a temperature sensor.

According to one embodiment of the invention, a plurality of measurement sensors distributed along the circumference of the strip is provided as a measurement sensor, the plurality of measurement sensors being associated with a plurality of respective pressing devices having a plurality of lifting members.

According to one embodiment of the invention, the lifting members are mutually integral.

According to one embodiment of the invention, the lifting members are formed by the same wire having at least one end section situated outside the casings to allow the lifting members to be removed.

According to one embodiment of the invention, the constraining member comprises a first spring inserted between the casing and the intermediate part.

According to one embodiment of the invention, at least one heat-insulating layer is provided between the intermediate part and the measurement sensor.

According to one embodiment of the invention, the device for clamping the strip around the object comprises:

at least one first hooking part attached in proximity to a first end of the strip and at least one second hooking part attached in proximity to a second end of the strip, a first module for connection to the hooking parts, capable of being mounted removably on them, the first module comprising a first spindle for driving the first hooking part in a first joining direction coming closer to the second hooking part and a second spindle for driving the second hooking part in a second joining direction coming closer to the first hooking part, at least one second guide on which the first and second spindles are slidably mounted respectively in the first and second joining directions, and at least one second bias spring mounted between at least one of the spindles and the second guide to cause the spindles to come closer one to another in the first and/or second joining direction, a second approximation module for bringing the spindles closer in the first and second directions, allowing the immobilization of the spindles in a clamping position of the belt around the object.

According to one embodiment of the invention, the second approximation module comprises a gripper for gripping the spindles.

According to one embodiment of the invention, the second approximation module comprises at least one first jaw for gripping the first spindle and at least one second jaw for gripping the second spindle, the first jaw being integral with at least one first arm, the second jaw being integral with at least one second arm, the first arm being hinged with respect to the second arm by a main axis of rotation situated at a distance from the jaws, the second approximation module further comprising at least one screw cooperating with the arms to cause the jaws to come closer one to another by rotation around the main axis.

According to one embodiment of the invention, the approximation module is of the parallelogram or pantograph type between the screw and the jaws.

According to one embodiment of the invention, the second approximation module comprises at least one first connecting rod having a first hinge axis with respect to the first arm between the main axis and the first jaw, at least one second connecting rod having a second hinge axis with respect to the second arm between the main axis and the second jaw, the connecting rods being mutually hinged by a third axis situated at a distance from the first and second axes, the screw cooperating with a first support mounted on the main axis and with a second support mounted on the third axis to allow the jaws to come closer one to another by moving the first and second supports away one from another.

Figure 5:
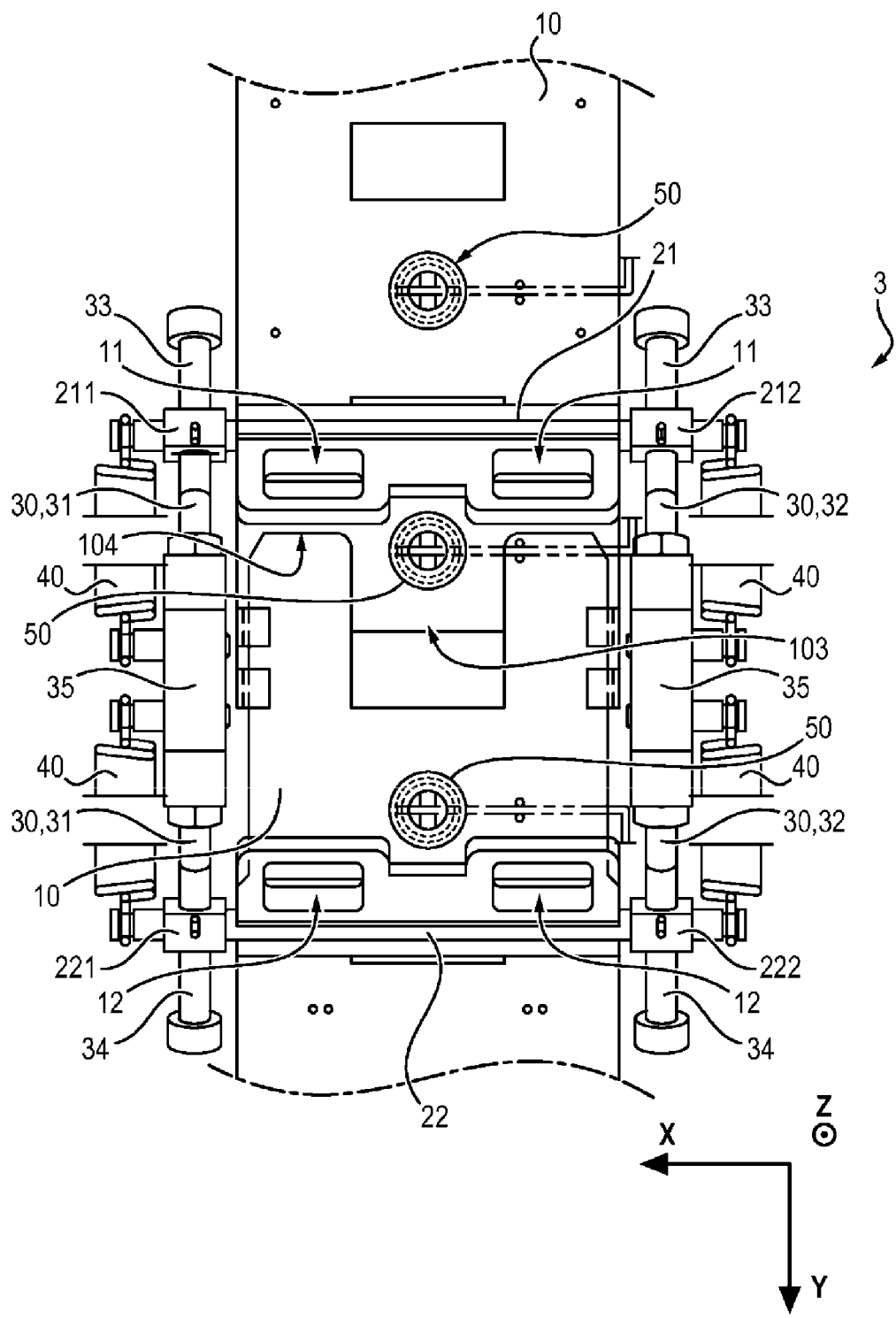
Figure 6:
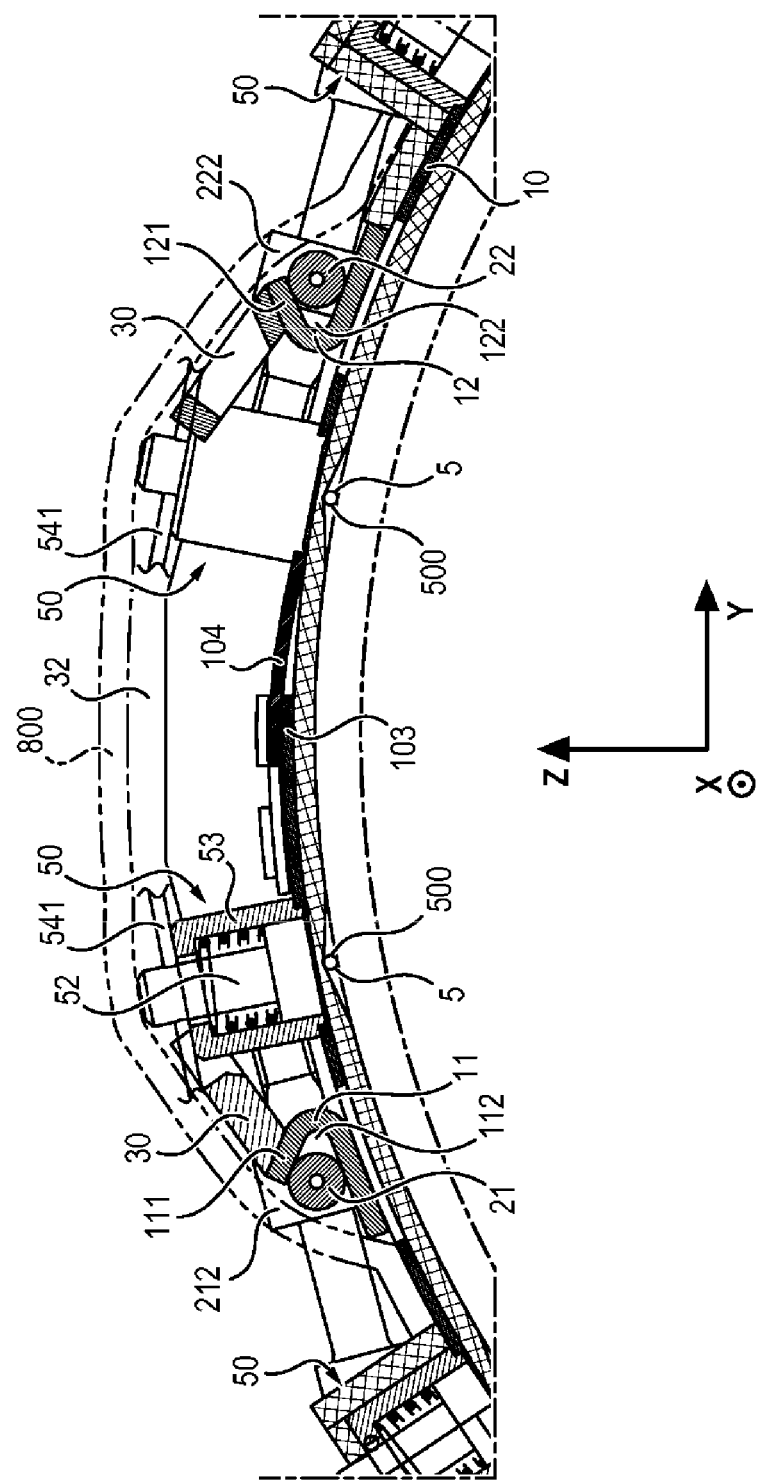
Figure 7:
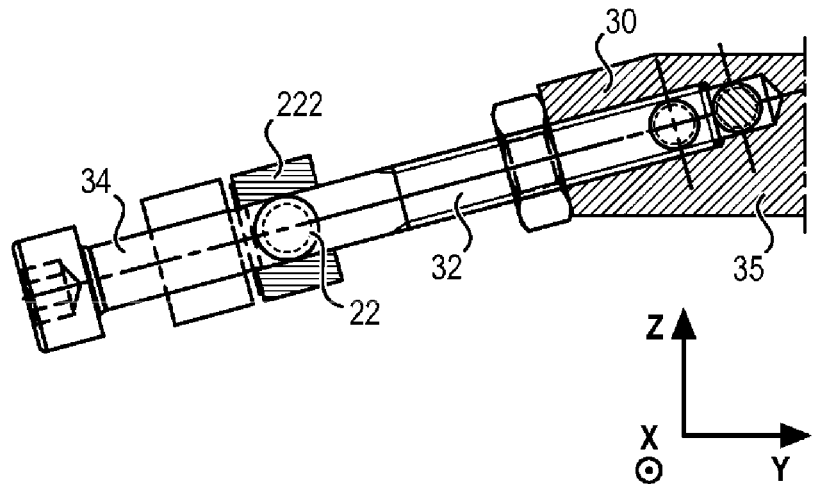
Figure 8:
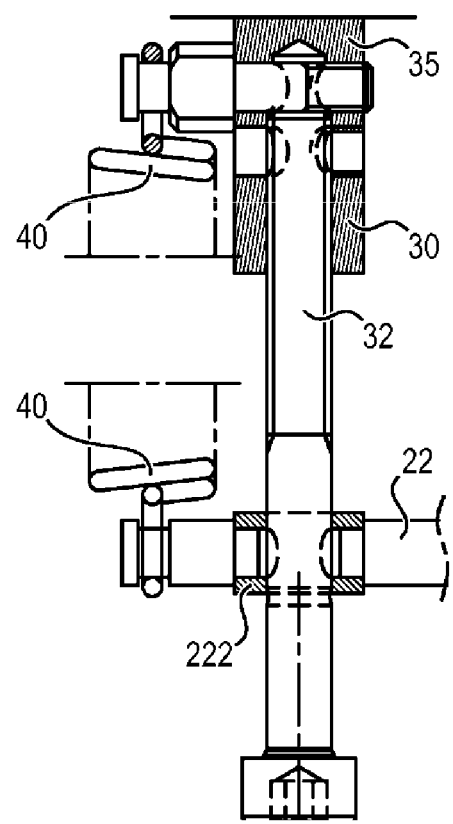
Figure 9:
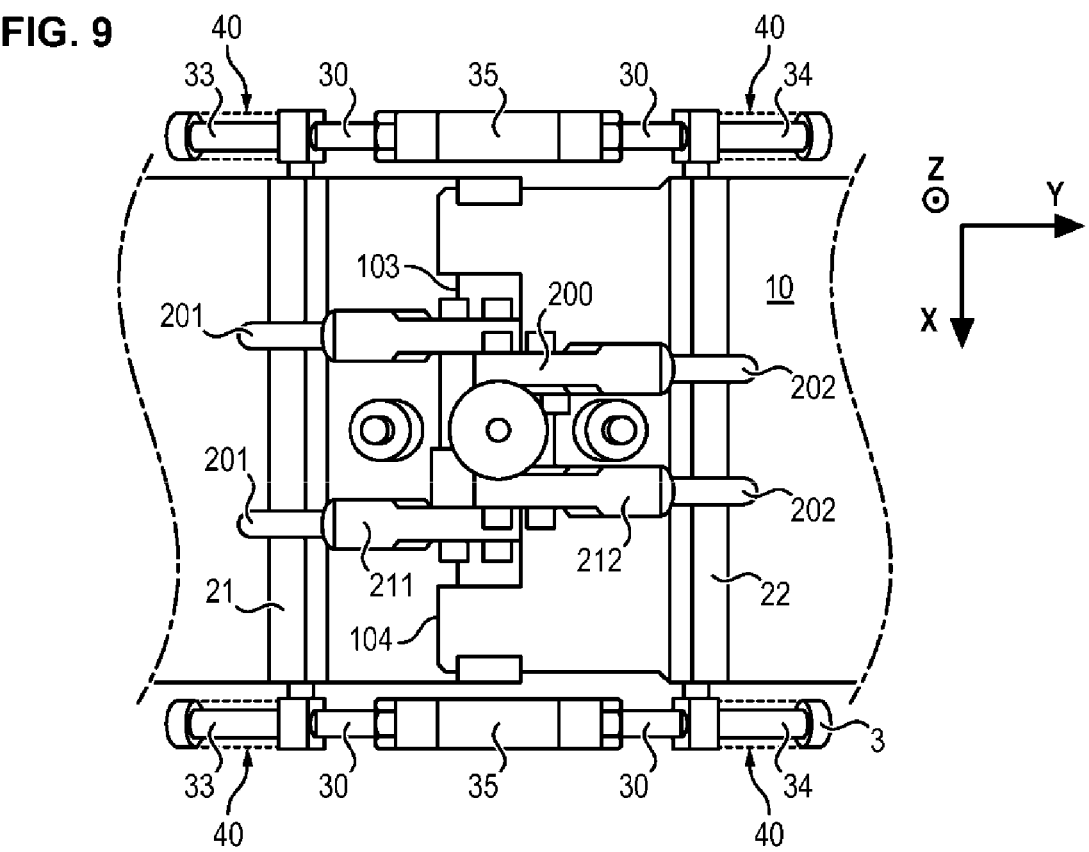
Figure 10:
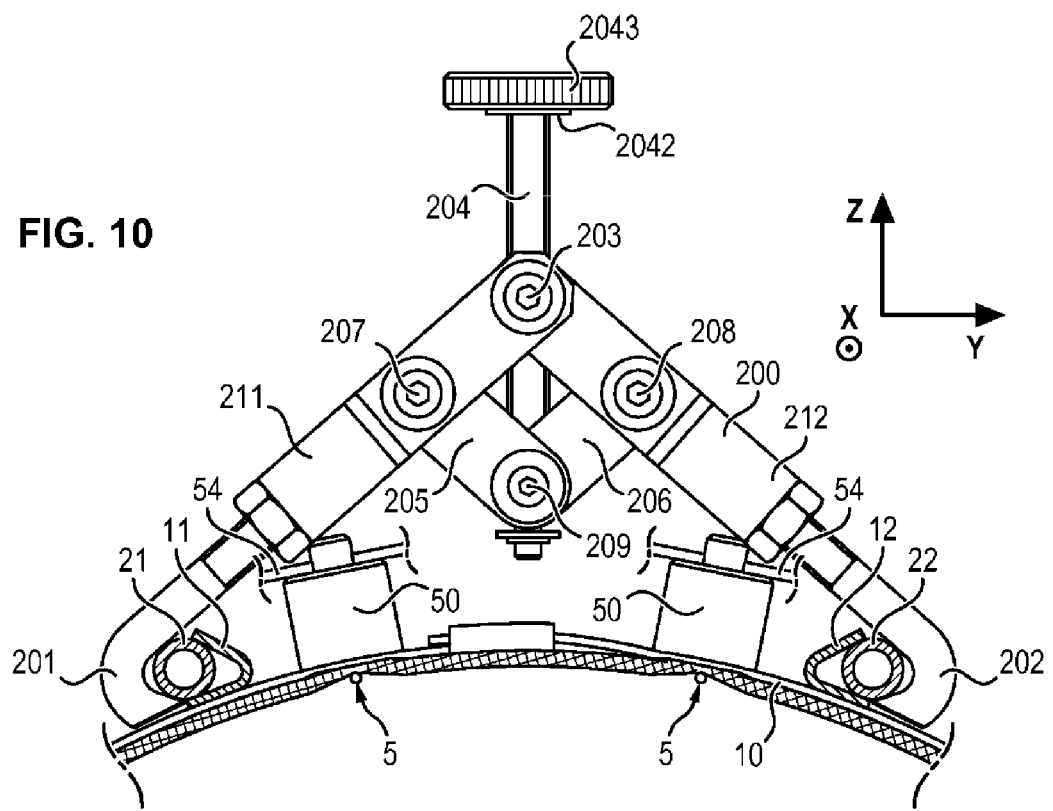
Figure 11:
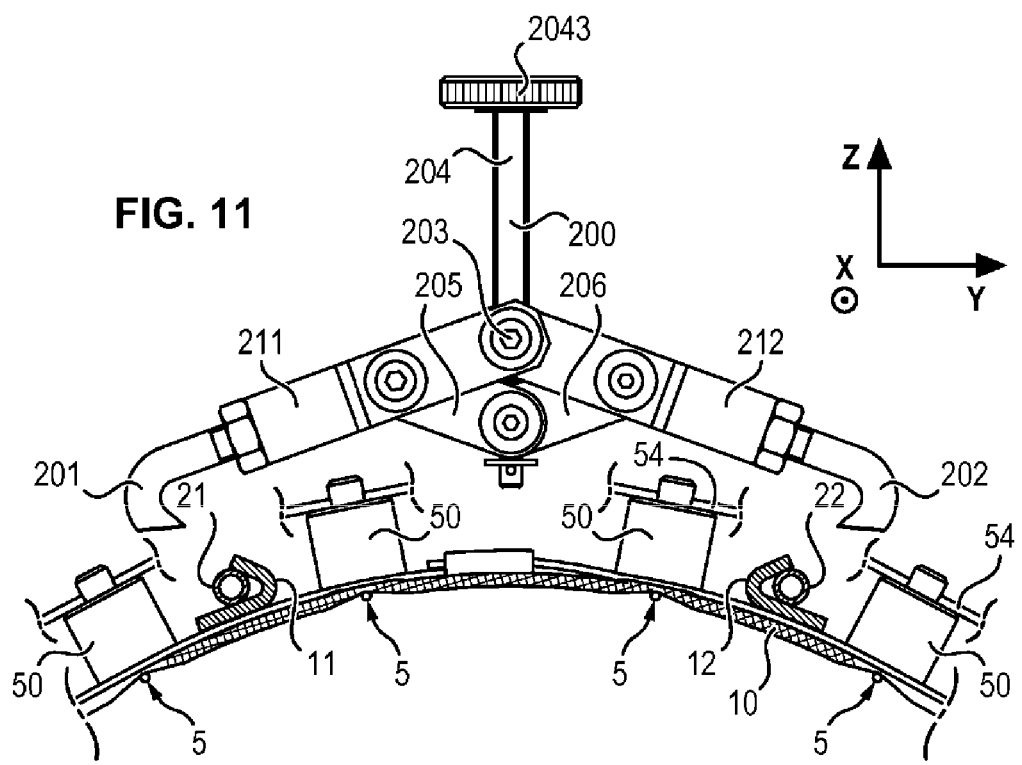
Figure 12:
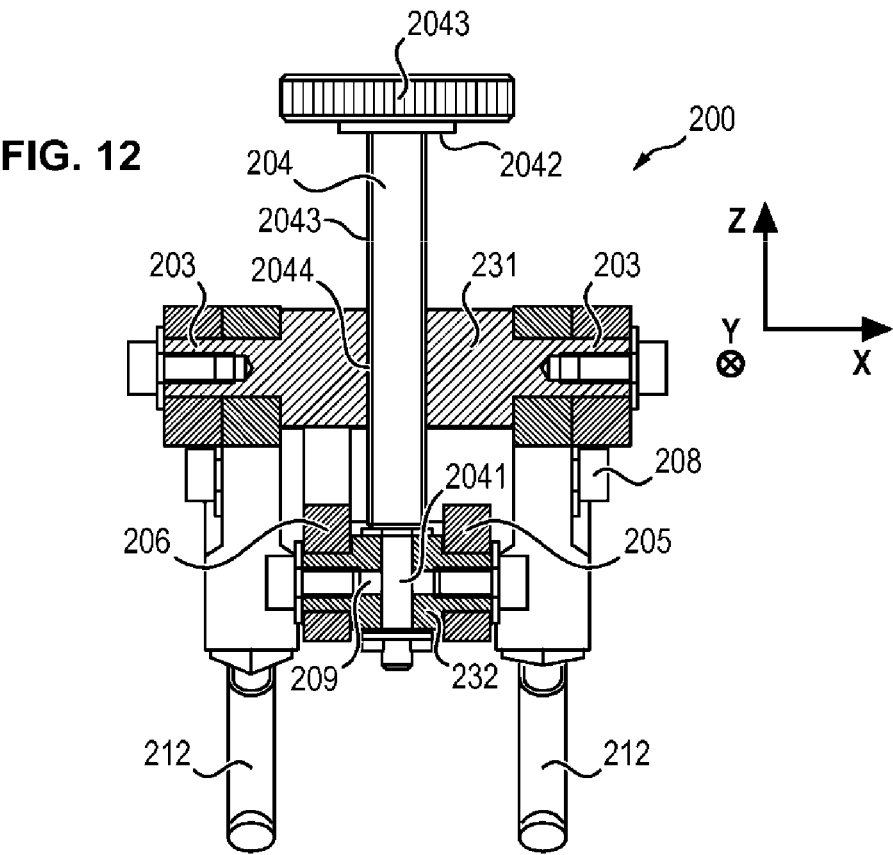
Figure 13:
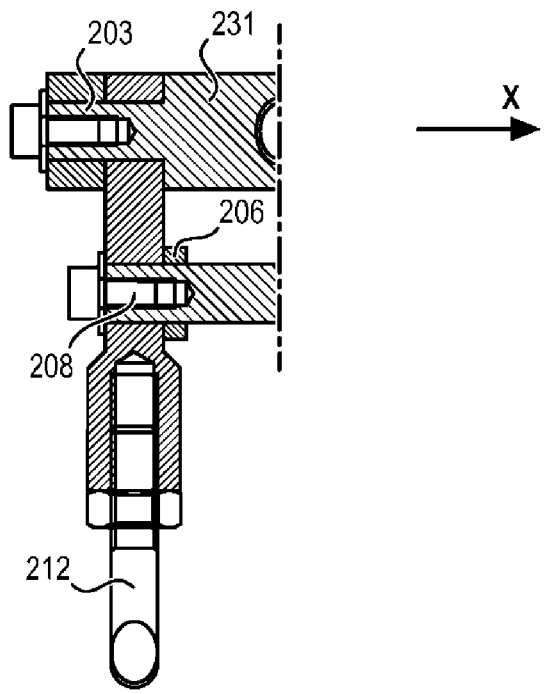
Figure 14:
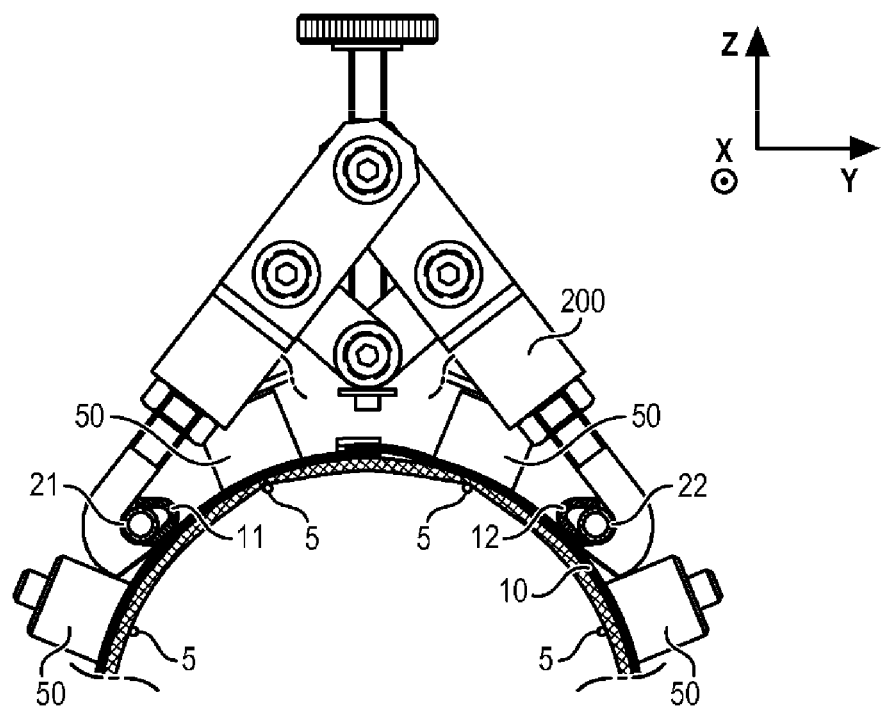
Figure 15:
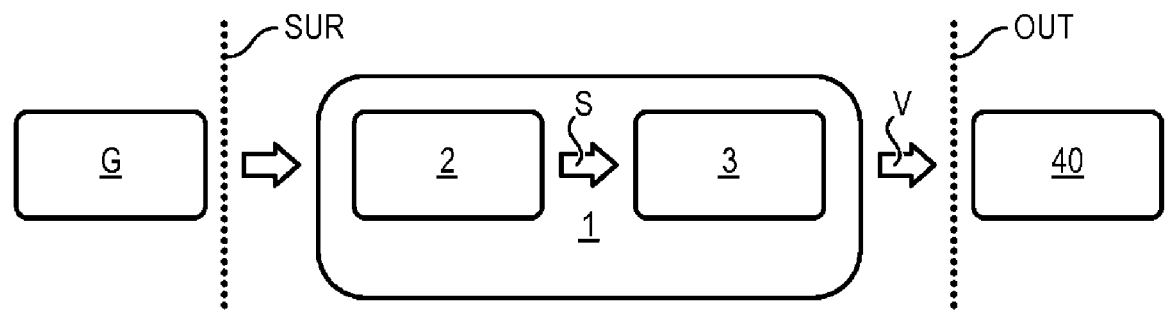
Figure 16:
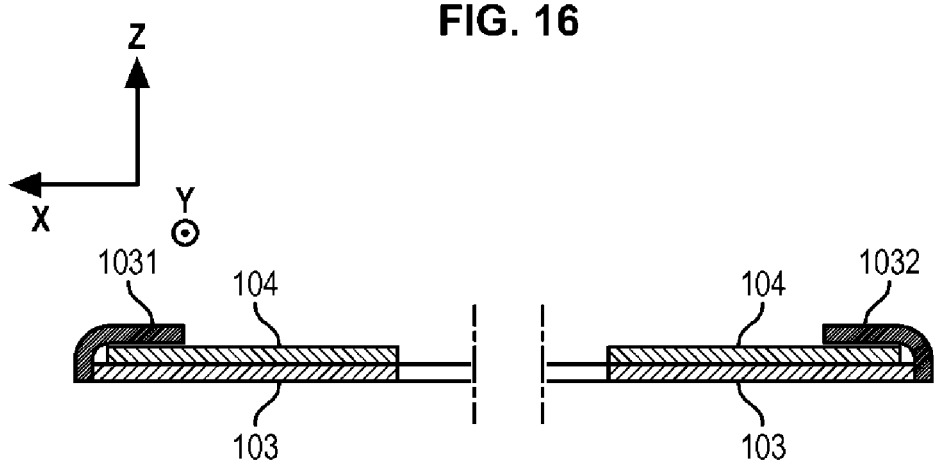
Figure 17:
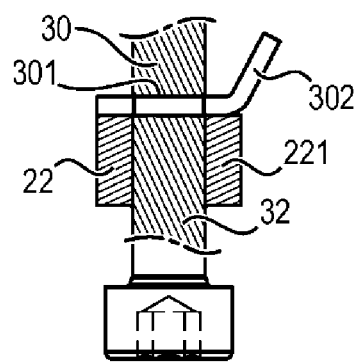

The invention will be better understood from reading the description that follows, given solely by way of a non-limiting example with reference to the appended drawings, in which:

FIG. 1 is a schematic view of the measurement belt in a transverse plane, when it is installed around an object, according to one embodiment of the invention, FIG. 2 is a schematic view from above of a strip of the belt according to one embodiment of the invention, in the unfolded, flat position, FIG. 3 is a schematic view in axial section of a pressing device of the sensor according to one embodiment of the invention, FIG. 4 is a schematic view in transverse section of the pressing device of the sensor of FIG. 3, according to one embodiment of the invention, FIG. 5 is a schematic top view of a clamping device of the belt according to an embodiment of the invention, FIG. 6 is a schematic view of a portion of the clamping device according to FIG. 5, in a transverse plane, FIG. 7 is a schematic view of a portion of the clamping device according to an embodiment of the invention in a transverse plane, FIG. 8 is a schematic view in top section view of a portion of the clamping device, attachment member and approximation member according to one embodiment of the invention, FIG. 9 is a schematic top view of the clamping device according to one embodiment of the invention, FIG. 10 is a schematic side view of an approximation module of the clamping device in a clamping position according to one embodiment of the invention, in a transverse plane, FIG. 11 is a schematic view of the approximation module of the clamping device, in a release position according to one embodiment of the invention, in a transverse plane, FIG. 12 is a schematic view in axial section of the approximation module according to an embodiment of the invention, FIG. 13 is a schematic view in axial section of an arm of the approximation module, according to one embodiment of the invention, FIG. 14 is a schematic view of the approximation module in the clamping position for another diameter of the object, in a transverse plane, FIG. 15 is a schematic of a measurement chain, in which the belt according to the invention can be provided, FIG. 16 is a schematic view in axial section of a strip of the belt, according to one embodiment of the invention, FIG. 17 is a schematic in section of a portion of the pressing device of the sensor according to one embodiment of the invention.

In the figures, the measurement belt 1 according to the invention is used to attach at least one sensor 5 against an object OBJ. This object OBJ can for example be a fluid pipe OBJ, such as for example a water pipe, as is described below. One case of application of the invention is a belt 1 for mechanical attachment of one or more measurement sensor(s) 5 on a liquid or gas pipe as the object OBJ. The object OBJ is for example a water pipe of the primary circuit of a pressurized-water nuclear reactor (PWR) of an electricity production power plant. The water pipe can be high-pressure piping. Of course, the belt 1 can comprise one or more sensors 5 such as one or more temperature sensors, level sensors, heat flow sensors or any other measurement sensor for a physical quantity. These sensors 5 can be temperature sensors (thermocouples, platinum probe, for example) but also other types of sensors (level measurement, heat flow for example). Different types of sensors can cohabit on the same belt and be implemented simultaneously.

The belt 1 comprises a strip 10 having a circumference intended to surround the object OBJ, such as for example the pipe OBJ.

In the figures, the object OBJ extends in an axial direction X, around which the belt 1 must be disposed. Consequently, the strip 10 of the belt 1 surrounds the object OBJ in a plane transverse to the direction X, this transverse plane being formed by the directions Z and Y, mutually perpendicular and perpendicular to the direction X. The direction Z originates from the axis X of the object OBJ to pass through the object OBJ toward the belt 1 intended to surround the object OBJ around this axis X. The direction Y is the direction tangent to the circumference of the strip 10 around the object OBJ and around the axis X. The strip 10 is a strip made of metal for example.

The object OBJ or the pipe OBJ has for example an outer cylindrical contour, circular for example. For example, in the case of a circular cylindrical object OBJ around the axis X, the direction Z is the radial centrifugal direction, starting with the inside to the outside with respect to the belt 1. The object OBJ or the pipe OBJ can have a metallic outer surface, made of steel for example, against which the belt 1 is disposed. Of course, the invention can apply to any type of object, particularly cylindrical around the direction X which must be surrounded by the belt 1, which can be other than those mentioned above such as for example thermodynamic systems, agri-food, petrochemistry, methanation units.

The belt 1 comprises at least one sensor 5. According to one embodiment, the belt 1 comprises at least one temperature sensor 5. For example, in FIG. 1, a plurality of temperature sensors 5 is provided in the belt 1. The temperature sensor(s) 5 are mounted below the strip 10 and therefore at a distance from the strip 10. According to one embodiment, at least one lower heat insulating layer 6 is provided between the strip 10 and the temperature sensor(s) 5. This heat insulating layer 6 is for example attached below the strip 10, below its inner side 109 turned toward the object OBJ, along its circumference intended to surround the object OBJ along the tangential direction Y. The temperature sensor 5 or each of the temperature sensors 5 comprises for example a thermocouple 500. The sensors 5 are for example at equal distance, one following the other, below the strip 10. For example, different types of sensors, i.e. sensors measuring different physical quantities, can cohabit on a same single belt and be implemented simultaneously.

The belt 1 further comprises a device 8 for clamping the strip 10 around the object OBJ. The clamping device 8 allows for example hooking the strip 10 around the object OBJ.

According to one embodiment, the sensor 5 is a part of a measurement chain. FIG. 1 represents these elements as well as the interfaces between the measurement chain and the outer elements. A first interface is for example formed by the outer surface SUR of the object OBJ, against which the sensor 5 must be attached by the belt 1. The sensor 5 serves to transform the physical quantity G or measured G into an exploitable (often electric) signal S. The conditioner COND converts the quantity S at the output of the sensor 5 into a voltage whose amplitude or frequency reflects the temporal evolution of the physical quantity G. The first interface SUR constitutes the border between the physical process and the information desired. The capacity of the sensor 5 to measure the physical quantity can be penalized by elements belonging to the environment (corrosion, geometric irregularities, humidity, etc.) and particularly for sensors in direct contact.

In certain applications (ex. measurements by fastening on piping) there exists another indispensable element for proper operation of the instrumentation chain. This is the mechanical attachment system 1 of the sensor 5 which has as its main role to support and hold the sensor 5 in contact with the component which it is desired to measure, most often piping, allowing the chain to continue to provide the function expected: measurement of the physical quantity. To guarantee the proper operation of the sensor 5, the attachment system 1 must also insulate it from any perturbation inherent in the process but not desirable for measurement (ex. vibration, thermal and mechanical constraints, etc.).

In the case of a pressurized-water reactor (PWR), a strict observance of the objectives of quality to be attained is indispensable. Such is the case in particular with mechanical equipment resisting pressure (primary, secondary and auxiliary circuits) for which the Design and Construction Rules (DCR-M for mechanical equipment) have been defined. For any mechanical equipment not subjected to the DCR, such as for example the system 1 for attaching the sensor 5, a qualification process must be implemented to guarantee the metrological performance of the instrumentation chains (functional qualification). Regarding the mechanical attachment system 1, there does not exist any dedicated design and manufacturing standards, but qualification tests must verify their safety with respect to the component on which it will be installed.

During qualification, conditions such as resistance to earthquakes, pressure, temperature or humidity can be verified.

In addition to the conditions required during qualification, other particular conditions of the primary circuit of a PWR must be considered when such attachment systems 1 are installed there permanently:

A mean temperature of 300° C. in operation and less than 70° C. during a unit outage.

An irradiation of 5 kGy/y (or 100000 Gy in 20 years) at full power.

The first condition above has an impact on the selection of the material and on the design of the attachment system 1. The system 1 for attaching the sensor 5 must be designed to resist strong mechanical constraints while still holding its main function. As for the second condition, it plays an implicit role in the selection of the material but the main impact of the irradiation on the design of the system 1 for attaching the sensor 5 is the intervention time necessary for the installation of the attachment system 1, or for any maintenance operation of the sensor 5 or the attachment system 1 itself.

One application case of the invention is a mechanical attachment belt 1 of a temperature sensor 5 against a water pipe OBJ of the primary circuit of a nuclear pressurized-water reactor of an electricity production power plant.

According to the invention, the belt 1 comprises a pressing device 50 for pressing the temperature sensor 5 in a first orientation 55 of a first direction directed toward the object OBJ. The pressing device 50 comprises at least one casing 53 attached to the strip 10. The temperature sensor 5 is situated below the strip 10. The casing 53 is situated on the strip 10.

The pressing device 50 further comprises at least one intermediate part 52 (or tappet 52) housed in the casing 53, and at least one constraining member 51 inserted between the casing 53 and the intermediate part 52. The intermediate part 52 serves to ensure coupling of the temperature sensor 5 against the object OBJ or the pipe OBJ or the piping OBJ. The constraining member 51 is capable of having the intermediate part 52 assume a first low position in which the intermediate part 52 presses toward the sensor 5 in the first orientation 55 directed toward the object OBJ. For example, as shown in FIG. 2, the strip 10 comprises one or more holes 101 allowing the passage of the intermediate part(s) 52 through the strip 10 in the orientation 55. The casing(s) 53 are each attached to the edges of the corresponding hole 101, for example by welding. In order to avoid or reduce direct conduction from a temperature sensor 5 site to another, which could perturb measurement, the strip 10 has cutouts 102, rectangular for example, situated between the holes 101. The casing 53 has for example a lateral cylindrical, for example circular, surface around the guiding orientation 55, the intermediate part 52 also being cylindrical, for example circular, against and inside the casing 53. The casing 53 is for example a perforated cylinder.

In the figures, the orientation 55 directed toward the object OBJ is for example in the opposite orientation to the direction Z.

For example, in the case of a circular cylindrical object OBJ around the axis X, the first orientation 55 is in this case the radial centripetal direction.

The pressing device 50 further comprises a lifting member 54 for holding the intermediate part 52 in a second lifting position situated above the first low position in a second orientation 56 of the first direction, which is opposite the first orientation 55 and which is against the constraining member 51. This second orientation 56 corresponds for example, in the case of a circular cylindrical object OBJ, to the centrifugal radial direction parallel to the direction Z and in the same orientation as that.

The lifting member 54 is actuable from the outside of the casing 53 to have the intermediate part 52 pass from the second lifting position to the first low position in which the intermediate part 52 presses toward the sensor 5.

The belt 1 takes into account constraints linked to the nuclear environment (ionizing radiation) as well as all the other constraints belonging to an industrial facility such as bulk, compatibility of materials, mechanical resistance of the system to earthquakes.

The measurement belt 1 according to the invention offers the advantage of being able to install a large number of measurement sensors 5 which can be of different natures, i.e. capable of measuring different physical quantities, in a very rapid manner around an object OBJ, which is particularly attractive in the case where this object OBJ is situated in a constraining environment, such as, for example, for nuclear applications where response time is very limited, as in the containment building of a nuclear reactor subjected to ionizing radiation, for which the operators must intervene in the shortest time possible to be subjected to as little as possible of this radiation. The invention thus allows installation, with high reliability, of a large number of sensors 5, of temperature for example, in these constraining environments.

The invention allows the sensor(s) 5 to be put into contact, with good coupling, directly with the object OBJ, which allows the accuracy of the measurement(s) to be optimized, and to reduce their response time.

In FIGS. 3 and 4, the intermediate part 52 or its portion 521, designed for temperature sensors, is for example in the form of a supporting pin. The intermediate part 52 comprises a lower base 521, for example a circular cylinder around the pressing orientation 55. The lower base 521 is situated on the side of the sensor 5 and is attached on its outer side to a rod 522 extending beyond the top of the casing 53 in the orientation 56. The constraining member 51 comprises for example a first spring 510 inserted between the casing 53 and the intermediate part 52. For example, the first spring 510 is housed in the casing 53. The spring 510 is for example a compression spring fitted around the rod 522 against the base 521 to push this base 521 in the first orientation 55 toward the temperature sensor 5.

According to one embodiment, the lifting member 54 passes through a first guide 520 provided in the intermediate part 52 and abuts against an abutment 530 of the casing 53 in the second lifting position. The lifting member 54 is capable of being removed from the first guide 520 of the intermediate part 52 to lower the intermediate part 52 from the second position to the first position pressing toward the sensor 5. The abutment 530 is for example formed by an outer wall of the casing 53, distant from the sensor 5.

According to one embodiment, the first guide 520 is formed by a hole 520 provided in the intermediate part 52, so that the lifting member 54 passes through the intermediate part 52 in the second position. The hole 520 is provided for example in the outer portion of the rod 522, situated outside the casing 53 in the second lifting position.

For example, the lifting member 54 comprises or is formed by a wire 540 having one or two end sections 541 situated outside the casing 53 to allow the removal of the lifting member 54. The wire 540 is metallic for example and can be made of stainless steel.

As shown in FIG. 1, a plurality of temperature sensors 5 distributed along the circumference 108 of the strip 10, to be distributed around the object OBJ, is for example provided as a sensor 5. A plurality of associated respective pressing devices 50 is provided for the plurality of temperature sensors 5, such as that described above. The temperature sensor(s) 5 are each connected to an outer cable 501, which extends under the strip 10 and which extends beyond it to be accessible from the outside and to be able to be connected to an external acquisition and processing unit for the measurements carried out by the sensor 5 (for example the conditioner COND and/or others). The pressing devices 50 are for example at equal distances, one following the other, on the strip 10. The respective lifting members 54 of the pressing devices 50 are for example mutually integrated.

According to one embodiment, the lifting members 54 are formed by the same wire 540 having one or two end sections 541 situated outside the casing 53 to allow the lifting members 54 to be removed.

Thus, during a first installation step of the belt 1 around the object OBJ, the pressing devices 50 are first pre-positioned in the second lifting position of the intermediate part 52. The strip 10 is disposed around the object OBJ, such as for example a circular cylinder pipe OBJ. Using the clamping device, the strip 10 is attached around the object OBJ in a position of immobilization.

Then, during a second step, the pressing device(s) 50 are made to pass from the second lifting position to the first low position by removing the lifting member 54, for example by pulling on the wire 540 to remove the latter. The constraining member 51 then displaces the intermediate part 52 in the first orientation 55 toward the temperature sensor 5 and toward the object OBJ, which holds the temperature sensor 5 between the intermediate part 52 and the object OBJ. Thus, the lifting member 50 prevents applying pressure to the temperature sensor 5 when the strip 10 is displaced with respect to the object OBJ during the first installation step, and thus prevents damaging it.

According to one embodiment, the at least one lower heat-insulating layer 6 is provided between the intermediate part 52 and the temperature sensor 5. Another external heat-insulating layer 7 can be attached over all or a portion of the outer surface 110 of the strip 10, far from the object OBJ. The outer heat-insulating layer 7 can cover the pressing device(s) 50, comprising the layer 532. The heat-insulating layer 6 and/or 7 and/or 532 has a thermal conductivity less than that of the strip 10 and/or that of the object OBJ or that of steel. For example, the heat-insulating layer 6 and/or 7 and/or 532 is made of a material having a thermal conductivity less than or equal to 0.5 W/mK at 300° C. According to one embodiment, the material of the heat-insulating layer 6 and/or 7 and/or 532 does not contain halogens, so as to be appropriate in use in a nuclear environment (PWR or other), as mentioned above. A foldable heat-insulating flap 800, for example made of canvas, attached to one side of the clamping device 8, can be provided to cover the clamping device 8 in its immobilization position. For example, the heat-insulating layer 6 and/or 7 and/or 532 is made of glass cloth. The lower heat-insulating layer 6, in permanent contact with the object OBJ, avoids any formation of an air gap between the belt 1 and the object OBJ. In the case of thermocouples 500, the sensors 5, put into contact individually and insulated by the glass cloth 6, have a rapid response time and good measurement accuracy, the effects of common mode being limited thanks to the design of the metal ribbon 10.

According to one embodiment, the thermocouple 500 of the temperature sensor 5 is attached, for example using ligature(s) 502, under the lower heat-insulating layer 6, and for example also with the outer heat-insulating layer 7 on the strip 10. Thus, the temperature sensor 5 or the thermocouple 500 is in contact with the object OBJ in the second low position of the pressing device 50 without being in direct contact with the strip 10; thermal drains caused by the belt are thus limited. The thermocouple 500 has for example a diameter of less than 5 mm, and is for example 1 mm. One or more ligature(s) 503 can also be provided to attach the outer heat-insulating layer 7 to the strip 10, for example with the lower heat-insulating layer 6, at places other than those where the temperature sensor 5 or thermocouple 500 are located.

The casing 53 can also be covered by a heat-insulating layer 532, nevertheless having a passage for the intermediate part 52 and/or the rod 522 and/or the lifting member 54.

The strip 10 is for example metallic, in the form of a ribbon, made for example of stainless steel sheet. The metal ribbon 10 is used to surround the pipe to guarantee solid attachment of the other elements of the system. The length of the strip 10 can be cut to be adapted to the circumference of the object OBJ or the pipe OBJ. The strip 10 is configured to tolerate variations in temperature (and therefore the mechanical constraints) belonging for example to high-pressure piping OBJ (for example the primary circuit of a pressurized-water reactor). The configuration of the strip 10 can be adapted to the instrumentation of elbows; in this case, the closure by the clamping device 10 will be positioned on the neutral fiber of the elbow.

According to one embodiment shown in FIG. 16, the strip 10 has a second end 104 narrower in the axial direction X than its other first end. The second end 104 slips under two metal guides 1031 and 1032 welded to the transverse edges of the other lower first end 103 of the strip 10.

Described below are the embodiments of the clamping device 8 of the strip 10 around the object OBJ, with reference to FIGS. 5 to 14.

In FIGS. 5 to 9, the clamping device 8 of the strip 10 comprises at least one first hooking part 11, attached (by welding for example) in proximity to a first end 103 of the strip and for example two hooking parts 12 distant from one another in the axial direction X. The clamping device 8 of the strip 10 also comprises at least one second hooking part 12 attached (by welding for example) in proximity to the second end 104 of the strip 10, for example two hooking parts 12 distant from one another in the axial direction X. A first module 3 for connection to the hooking parts 11, 12 is capable of being mounted removably on them. The hooking parts 11, 12 have at least one protruding hook 111, 121, for example V-shaped, the hooks 111, 121 extending away from one another in the opposite orientation of one another in the direction Y. The parts 11, 12 or hooks 111, 121 each have a recess 112, 122 for receiving spindles, respectively 21 and 22. The hooking parts 11, 12 can be welded upon request depending on the geometry of the belt which depends on the diameter of the object OBJ. The hooking parts 11, 12 allow a solid assembly between the strip 10 and the object OBJ during the first installation step, to then allow the attachment of the approximation module 200.

The first module 3 comprises a first spindle 21 for driving the first hooking part 11 in a first joining direction directed toward the second hooking part 12 and a second spindle 22 driving the second hooking part 12 in a second joining direction directed toward the first hooking part 11.

The connecting module 3 comprises a second guide 30 on which the first and second spindles 21, 22 are slidably mounted respectively in the first and second joining direction(s), and at least one second bias spring 40 mounted between at least one of the spindles 21, 22 and the second guide 30 to cause the spindles 21, 22 to come closer one to another in the first and/or second joining direction(s). The first and second joining directions are therefore substantially parallel to the direction Y in the figures, i.e. the direction tangent to the circumference 108 of the strip 10 around the object OBJ and around the axis X. The guide 30 is for example adjustable.

The spring 40 is for example a tension spring in FIG. 5, while in the example of FIG. 9, the spring 40 is a compression spring. At least one bias spring 40 mounted between the spindle 21 and the guide 30, and at least another spring 40 mounted between the spindle 22 and the guide 30 are for example provided.

The guide 30 comprises for example a first guide portion 31, on which a first portion 211 of the first spindle 21 is slidably mounted and on which a first portion 221 of the second spindle 22 is slidably mounted, as well as a second guide portion 32 on which a second portion 212 of the first spindle 21 is slidably mounted and a second portion 222 of the second spindle 22 is slidably mounted. The guide 30 or each guide portion 31, 32 is for example in the shape of a stirrup having, on the one hand a first section 33 for guiding of the first spindle 21, and on the other hand a second section for guiding 34 of the second spindle 22. The sections 33, 34 are connected to a core 35 situated between them in the first and/or second joining direction.

To install the connecting module 3, the first spindle 21 is passed behind the hooking part(s) 11 against the force of the spring(s) 40 and the spindle 22 is passed behind the hooking part 12 against the force of the spring(s) 40 acting on this spindle 22.

According to the embodiment shown in FIG. 17, the guide 30 can comprise one or more stop holes 301 in which are placed one or more other wires 302 (for example metal wires) for holding the spindle 21 (or portion 211 or 212) and/or 22 (or portion 221 or 222) against the force exerted by the spring 40, in a position spreading the spindles 21 and 22 with respect to the hooking parts 11, 12. This thus allows fitting the spindles 21 and 22 around the hooking parts 11, 12. It is then sufficient to withdraw the wire(s) 302 to release the spring 40 which then displaces the spindle 21 and/or 22 against the hooking parts 11, 12 to clamp them. The connecting module 3 provides elastic holding on the object OBJ so as to resist differential dilations and to vibrations. The connecting module 3 may not have been designed to withstand the intense mechanical forces exerted in particular during the application of pressure to the sensors 5. The connecting module 3 makes it possible to ensure the holding of the belt 1 over the entire dimensional range of the standard.

The module 3 makes it possible to pre-position the belt 1 around the object OBJ in order to, firstly, close the belt 1 around the object OBJ during the first step. The spring(s) 40 allow pre-constraining the first module 3 in a position connecting the hooking parts 11, 12 together, so as to close the strip 10 around the object OBJ.

The measurement belt 1 allows the simultaneous implementation of a large quantity of measurement points in a few minutes while still guaranteeing their geometric position. Manufactured for one diameter of piping, it can be positioned without adjustment over the entire range of the standard. The positioning of the sensors 5, but also of the exit of the cables of the sensors 5 during manufacture allows, in application of the implementation procedure, a guarantee against any error in positioning and any ambiguity in benchmarking. The recommendations which are made there regarding packaging allow the risks of radiological or chemical surface contamination to be limited.

The belt 1 allows accomplishing measurements on piping OBJ with small diameters with a large density of measurement points by mixing, as needed, the types of sensors and being able to accomplish measurements in elbows and over all diameters. The measurement belt 1 is compact and easily adaptable to the specific needs of its use. Its range of applicability extends from 1.5 inches to several hundred inches. In the case of large diameters of the object OBJ, the recourse to several sections of strip 10, connected to one another, allows guaranteeing good holding of the belt 1 at all points of the circumference, the positioning devices allowing the observance of the spacing provided between each section. A particular design allows its use in elbows. Despite that, the sensors 5 and the thermocouples 500 remain identical, they can be mixed on the same belt. With a very small thickness, the belt 1 has been designed for rapid installation (less than 2 minutes per belt) and for low bulk; it can be used up to 400° C. and be covered by a mattress thermal insulator without particular specification (for example for nuclear applications). The measurement belt 1 having a very small thickness, it does not require a specific design of a thermal insulator and can be covered by a standard mattress thermal insulator. The belt can carry one or more sensors 5, the possible density of the sensors 5 depending to a large extent on the volume of the sensor itself and on the bulk of the device 50 for applying pressure. In the case of thermocouples, this density can be very large (up to 1 sensor for every 15 mm of the circumference of the strip 10), a density which can be doubled by placing the sensors 5 offset both in the axial direction X and in the tangential direction Y, with the same offset for the pressing devices 50 situated above the sensors 5, for example in alternating pitch as shown in FIG. 6 for the sensors and the pressing devices 50.

The belt 1, very light, being attached elastically on the object OBJ or the piping OBJ, and each sensor 5 having an individual pressing system, the belt 1 guarantees good contact between the sensor and the piping, independently of variations in temperature (causing dilation and therefore mechanical constraints), vibrations or clamping torque on the object OBJ or the piping OBJ. It has perfect safety with regard to the facility in which the object OBJ is located or the fluid circuit in which the piping or pipe OBJ is located.

The clamping device 8 further comprises a second approximation module 200 for the spindles 21, 22 in the first and second directions, allowing the immobilization of the spindles 21, 22 in a clamping position of the belt 1 around the object OBJ. This approximation module 200 comprises for example a gripper for gripping the spindles 21, 22 as shown in FIGS. 9 to 14.

According to one embodiment, the second approximation module 200 comprises a first jaw 201 for gripping the first spindle 21 and a second jaw 202 for gripping the second spindle 22. The first jaw 201 is integral with a first arm 211, while the second jaw 202 is integral with a second arm 212. The first arm 211 is hinged with respect to the second arm 212 by a main axis of rotation 203, which is situated at a distance from the jaws 201, 202.

The second approximation module 200 further comprises at least one screw 204 cooperating with the arms 211 and 212 to cause the jaws 201, 202 to come nearer one to another by rotation of the arms 211, 212 around the main axis 203.

According to one embodiment, the approximation module 200 is of the parallelogram or pantograph type between the screw 204 and the jaws 201 and 202.

Thus, according to one embodiment, the approximation module 200 comprises a first connecting rod 205 having a first hinge axis 207 with respect to the first arm 211, this hinge axis 207 being situated between the main axis 203 and the first jaw 201. In addition, the second approximation module 200 comprises a second connecting rod 206 having a second hinge axis 208 with respect to the second arm 212, this hinge axis 208 being situated between the main axis 203 and the second jaw 202. The connecting rods 205 and 206 are hinged to one another by a third hinge axis 209, which is situated at a distance from the axes 207 and 208. The screw 204 cooperates with a first support 231 mounted on the main axis 203 and with a second support 232 mounted on the third axis 209 to allow the jaws 201, 202 to come closer one to another by moving the first and second supports 231 and 232 away from one another.

For example, the connecting rod 205 is parallel to the arm 212, while the connecting rod 206 is parallel to the arm 211. Two first jaws 201 are provided for example of respectively two first arms 211, which are situated at a distance from one another in the axial direction X surrounded by the belt 1 and/or two second jaws 202 of respectively two second arms 212 situated at a distance from one another in the axial direction X surrounded by the belt 1.

For example, the lower end 2041 of the screw 204 is mounted freely in the lower support 232, while, between its lower end 2041 and its upper head 2042, the screw 204 comprises a thread 2043 inserted in a corresponding internal screw thread 2044 of the upper support 231 to, by rotation of the head 2042, cause the support 231 to come closer to and move away from the support 232 by rotation of the head 2042 in one direction or in the other. For this purpose, the head 2042 can be attached to a thumbwheel 2043 for manual gripping of the screw 204. Thus, the rotation of the screw 204 in one direction causes the approximation of the arms 211 and 212 against the spindles 21 and 22, which allows the spindles 21 and 22 to be clamped to one another and therefore to clamp to one another the hooking parts 11 and 12 of the strip 10. Due to the jaws 201 and 202, this clamping is accomplished with great force and allows the belt 1 to be cramped in a position of immobilization against the object OBJ. This clamping by bringing the jaws 201 and 202 closer one to another is therefore accomplished because the module 3 was previously mounted on the parts 11 and 12, beyond the clamping procured by the connecting module 3 of the spindles 21 and 22.

When the clamping device 8 is in the position for immobilizing the strip 10 around the object OBJ, during the second step the lifting member 54 is actuated to have the intermediate part(s) 52 pass from the second lifting position to the first low position pressing toward the sensor 5, which presses and immobilizes the sensor(s) 5 toward the object OBJ.

To remove the belt 1 from the object OBJ, the clamping device 8 is actuated, namely, in the example described above, the screw 200 is actuated to move the arms 211, 212 away from one another in order to move the jaws 201 and 202 away from the spindles 21 and 22, as shown in FIG. 11, for example at least to an opening angle of 140° between the arms 211 and 212. Then the connecting module 3 is removed with respect to the hooking parts 11 and 12. As shown in FIGS. 10 and 14, the approximation module 200 offers the advantage of being able to adapt to strips 10 of different circumference lengths 108 between their hooking parts 11 and 12, FIG. 14 thus showing the strip 10 with a length smaller than that of FIG. 10.

The clamping device 8 offers the advantage of being adaptable to a large range of object diameters and belt lengths and to all cylindrical objects: piping, pressurizers, steam generators, reactors, exchangers, water pipes. Non elastic, it allows the accurate positioning of the belt 1 and is designed to tolerate intense mechanical constraints, particularly during the application of pressure to the sensors 5. It ensures the immobility of the belt 1 during the installation of the clamping device (second step) or during its withdrawal during dismantling of the instrumentation. In the case of devices comprising several belts 1 connected to one another to girdle a large diameter or a complex shape, it is the clamping devices 8 which will allow good positioning of each belt 1 to be ensured and will provide for their firm holding.

The belt 1 allows the simultaneous implementation of several types of sensors on the same single belt 1. Their positioning, accomplished on demand during manufacture, allows them to be adapted to actual needs. The installation of the belt 1 is very rapid and the implementation of the sensors 5 being carried out individually when the belt is firmly tied to the piping, can be adapted specifically to each type of sensor. The dismantling-reassembly of the belt 1 during maintenance shutdowns of facilities, during radiography operations particularly, is rapid and the reconditioning of the pressing devices 50 of the sensors 5 is easy.

The invention claimed is:

1. A belt for measuring physical quantities of an object, the belt comprising:
   at least one measurement sensor,
   a strip having a circumference intended to surround the object,
   a device for clamping the strip around the object,
   wherein the belt further comprises a pressing device for pressing the measurement sensor in a first orientation of a first direction directed toward the object,
   the pressing device comprising at least one casing attached to the strip, at least one intermediate part housed in the casing, and at least one constraining member inserted between the casing and the intermediate part and capable of having the intermediate part assume a first low position in which it presses toward the sensor in the first orientation of the first direction toward the object,
   the pressing device of the sensor further comprises a lifting member, for holding the intermediate part in a second lifting position above the first low position in a second orientation of the first direction, opposite the first orientation against the constraining member,
   the lifting member being actuable from the outside of the casing to have the intermediate part pass from the second lifting position to the first low position in which it presses toward the sensor, wherein the lifting member passes through a first guide provided in the intermediate part and abuts against an abutment of the casing in the second lifting position, the lifting member being capable of being removed from the first guide of the intermediate part to have the intermediate part pass from the second lifting position to the first low position in which it presses toward the sensor.

2. The belt according to claim 1, wherein the first guide comprises in the intermediate part a hole for letting through the lifting member in the intermediate part during its passage into the second lifting position.

3. The belt according to claim 1, wherein the lifting member comprises a wire having at least one end section situated outside the casing to allow the lifting member to be removed.

4. The belt according to claim 1, wherein the measurement sensor is a temperature sensor.

5. The belt according to claim 1, comprising a plurality of measurement sensors distributed along the circumference of the strip as a measurement sensor, the plurality of measurement sensors being associated with a plurality of respective pressing devices having a plurality of lifting members.

6. The belt according to claim 5, wherein the lifting members are attached to one another.

7. The belt according to claim 5, wherein the lifting members are formed by the same wire having at least one end section situated outside the casings to allow the lifting members to be removed.

8. The belt according to claim 1, wherein the constraining member comprises a first spring inserted between the casing and the intermediate part.

9. The belt according to claim 1, comprising at least one heat-insulating layer between the intermediate part and the measurement sensor.

10. The belt according to claim 1, wherein the device for clamping the strip around the object comprises:
at least one first hooking part attached in proximity to a first end of the strip and at least one second hooking part attached in proximity to a second end of the strip,
a first module for connection to the hooking parts, capable of being mounted removably on them,
the first module comprising a first spindle for driving the first hooking part in a first joining direction coming closer to the second hooking part and a second spindle for driving the second hooking part in a second joining direction coming closer to the first hooking part, at least one second guide on which the first and second spindles are slidably mounted respectively in the first and second joining directions, and at least one second bias spring mounted between at least one of the spindles and the second guide to cause the spindles to come closer one to another in the first and/or second joining direction,
a second approximation module for bringing the spindles closer in the first and second directions, allowing the immobilization of the spindles in a clamping position of the belt around the object.

11. The belt according to claim 10, wherein the second approximation module comprises a gripper for gripping the spindles.

12. The belt according to claim 10, wherein the second approximation module comprises at least one first jaw for gripping the first spindle and at least one second jaw for gripping the second spindle, the first jaw being integral with at least one first arm, the second jaw being integral with at least one second arm, the first arm being hinged with respect to the second arm by a main axis of rotation situated at a distance from the jaws, the second approximation module further comprising at least one screw cooperating with the arms to cause the jaws to come closer one to another by rotation around the main axis.

13. The belt according to claim 12, wherein the approximation module is of the parallelogram or pantograph type between the screw and the jaws.

14. The belt according to claim 12, wherein the second approximation module comprises at least one first connecting rod having a first hinge axis with respect to the first arm between the main axis and the first jaw, at least one second connecting rod having a second hinge axis with respect to the second arm between the main axis and the second jaw, the connecting rods being mutually hinged by a third axis situated at a distance from the first and second axes, the screw cooperating with a first support mounted on the main axis and with a second support mounted on the third axis to allow the jaws to come closer one to another by moving the first and second supports away one from another.

15. A belt for measuring physical quantities of an object, the belt comprising:
at least one measurement sensor,
a strip having a circumference intended to surround the object,
a device for clamping the strip around the object,
wherein the belt further comprises a pressing device for pressing the measurement sensor in a first orientation of a first direction directed toward the object,
the pressing device comprising at least one casing attached to the strip, at least one intermediate part housed in the casing, and at least one constraining member inserted between the casing and the intermediate part and capable of having the intermediate part assume a first low position in which it presses toward the sensor in the first orientation of the first direction toward the object,
the pressing device of the sensor further comprises a lifting member, for holding the intermediate part in a second lifting position above the first low position in a second orientation of the first direction, opposite the first orientation against the constraining member,
the lifting member being actuable from the outside of the casing to have the intermediate part pass from the second lifting position to the first low position in which it presses toward the sensor,
wherein the lifting members are attached to one another.

16. A belt for measuring physical quantities of an object, the belt comprising:
at least one measurement sensor,
a strip having a circumference intended to surround the object,
a device for clamping the strip around the object,
wherein the belt further comprises a pressing device for pressing the measurement sensor in a first orientation of a first direction directed toward the object,
the pressing device comprising at least one casing attached to the strip, at least one intermediate part housed in the casing, and at least one constraining member inserted between the casing and the intermediate part and capable of having the intermediate part assume a first low position in which it presses toward the sensor in the first orientation of the first direction toward the object,
the pressing device of the sensor further comprises a lifting member, for holding the intermediate part in a second lifting position above the first low position in a second orientation of the first direction, opposite the first orientation against the constraining member, the lifting member being actuable from the outside of the casing to have the intermediate part pass from the second lifting position to the first low position in which it presses toward the sensor, and wherein the device for clamping the strip around the object comprises:
- at least one first hooking part attached in proximity to a first end of the strip and at least one second hooking part attached in proximity to a second end of the strip,
- a first module for connection to the hooking parts, capable of being mounted removably on them,
- the first module comprising a first spindle for driving the first hooking part in a first joining direction coming closer to the second hooking part and a second spindle for driving the second hooking part in a second joining direction coming closer to the first hooking part, at least one second guide on which the first and second spindles are slidably mounted respectively in the first and second joining directions, and at least one second bias spring mounted between at least one of the spindles and the second guide to cause the spindles to come closer one to another in the first and/or second joining direction, a second approximation module for bringing the spindles closer in the first and second directions, allowing the immobilization of the spindles in a clamping position of the belt around the object.

17. The belt according to claim 16, wherein the second approximation module comprises a gripper for gripping the spindles.

18. The belt according to claim 16, wherein the second approximation module comprises at least one first jaw for gripping the first spindle and at least one second jaw for gripping the second spindle, the first jaw being integral with at least one first arm, the second jaw being integral with at least one second arm, the first arm being hinged with respect to the second arm by a main axis of rotation situated at a distance from the jaws, the second approximation module further comprising at least one screw cooperating with the arms to cause the jaws to come closer one to another by rotation around the main axis.

19. The belt according to claim 18, wherein the approximation module is of the parallelogram or pantograph type between the screw and the jaws.

20. The belt according to claim 18, wherein the second approximation module comprises at least one first connecting rod having a first hinge axis with respect to the first arm between the main axis and the first jaw, at least one second connecting rod having a second hinge axis with respect to the second arm between the main axis and the second jaw, the connecting rods being mutually hinged by a third axis situated at a distance from the first and second axes, the screw cooperating with a first support mounted on the main axis and with a second support mounted on the third axis to allow the jaws to come closer one to another by moving the first and second supports away one from another.

* * * * *